United States Patent [19]

Yasui et al.

[11] 4,390,493
[45] Jun. 28, 1983

[54] PROCESS FOR INJECTION MOLDING A POLYESTER WITH IMPROVED CRYSTALLIZATION THEREOF

[75] Inventors: Koichi Yasui; Jinpei Hisano, both of Nobeoka, Japan

[73] Assignee: Asahi Kasei Kogyo Kabushiki Kaisha, Osaka, Japan

[21] Appl. No.: 229,214

[22] Filed: Jan. 28, 1981

[51] Int. Cl.³ .............................................. B29F 1/08
[52] U.S. Cl. .............................................. 264/328.16
[58] Field of Search ................................... 264/328.16

[56] References Cited

U.S. PATENT DOCUMENTS 4,150,079  4/1979  Chang ..................... 264/328.16 X

FOREIGN PATENT DOCUMENTS 55-32737  8/1980  Japan .

Primary Examiner—Thomas P. Pavelko
Attorney, Agent, or Firm—Sughrue, Mion, Zinn, Macpeak and Seas

[57] ABSTRACT

A process for injection molding a polyester with improved crystallization thereof is described, which comprises incorporating, prior to molding, incorporating in the polyester as a crystallization accelerator a compound containing at least one aromatic ring selected from the group consisting of a benzene ring, a naphthalene ring and an anthracene ring; at least one sulfonic acid alkali metal salt group; and at least one phenolic hydroxy alkali metal salt group.

11 Claims, No Drawings

PROCESS FOR INJECTION MOLDING A POLYESTER WITH IMPROVED CRYSTALLIZATION THEREOF

BACKGROUND OF THE INVENTION

This invention relates to a process using a novel crystallization accelerator to greatly increase the crystallization rate of polyesters.

As is well known in the art, polyethylene terephthalate is widely used, e.g., as a fiber, a film, an nonwoven fabric, or the like because of its excellent physical properties. Since, however, its crystallization rate is low, insufficient crystallization generally occurs when using a mold at low temperatures, e.g., from about 80° C. to about 120° C., which temperature range is usually employed in injection molding of thermoplastic polymers, and it has therefore been difficult to produce molded articles of polyethylene terephthalate having the desired physical properties.

In order to increase the crystallization rate of polyethylene terephthalate, a number of crystallization accelerators or crystal nucleating agents have been proposed, including sodium benzoate as disclosed in Japanese Patent Publication No. 29977/71, lithium terephthalate and sodium stearate as disclosed in Japanese Patent Publication No. 14502/72, alkali metal salts of phosphonic acid and phosphinic acid as disclosed in Japanese Patent Publication No. 27140/72.

Many of these crystallization accelerators are salts of weak acids, such as carboxylic acid, or salts of strong acids, such as phosphoric acid and sulfonic acid. The salts of strong acids, however, cannot be dispersed uniformly in polyethylene terephthalate, but are present therein in an insular form as a foreign substance, although their crystallization acceleration effect is great. This leads to unevenness in quality of the resulting polymer, and, furthermore, only a limited portion of the crystallization accelerator added participates in the crystallization acceleration action. With regard to the salts of weak acids, their crystallization acceleration effect is poor, although they can uniformly be dispersed in polyethylene terephthalate. It is therefore necessary to add such a crystallization accelerator in a large amount and, as a result, uniform dispersion of the crystallization accelerator in the polymer cannot readily be attained.

SUMMARY OF THE INVENTION

An object of this invention is to provide a process for injection molding a polyester, and particularly polyethylene terephthalate, by using a crystallization accelerator which when added to polyethylene terephthalate (which has heretofore not been used in conventional injection molding because of its low crystallization rate), permits it to be used in injection molding.

Another object of this invention is to provide a process using a crystallization accelerator which, when added to polybutylene terephthalate, has a sufficiently high crystallization rate and has already been used in injection molding, increases its crystallization rate to a high level and permits it to be injection-molded at a higher molding cycle rate.

As a result of extensive studies for crystallization accelerators which markedly increase the crystallization rate of polyethylene terephthalate and also other polyesters, and furthermore which have sufficient affinity with polyesters and can be uniformly mixed therewith, the present invention has been made.

This invention, therefore, provides a process for injection molding a polyester with improved crystallization thereof, comprising incorporating, prior to molding, in the polyester as a crystallization accelerator a compound containing (1) at least one aromatic ring selected from the group consisting of a benzene ring, a naphthalene ring and an anthracene ring;

(2) at least one sulfonic acid alkali metal salt group; and (3) at least one phenolic hydroxy alkali metal salt group in an amount of from 0.05 to 20% by weight based on the weight of the polyester.

DETAILED DESCRIPTION OF THE INVENTION

Examples of crystallization accelerators that can be used according to the process of this invention include a compound containing an aromatic ring to which at least one sulfonic acid alkali metal salt group and at least one phenolic hydroxy alkali metal salt group are directly bonded, such as disodium p-phenolsulfonate, lithium sodium p-phenolsulfonate, potassium sodium p-phenolsulfonate, di-potassium p-phenolsulfonate, disodium p-($\beta$-sulfoethoxy)-phenol, disodium m-phenolsulfonate, disodium 2-naphthol-6-sulfonate, disodium 2-naphthol-8-sulfonate, tetrasodium resorcin-4,6-disulfonate, trisodium catechol-3-sulfonate, trisodium 2,3-naphthalenediol-6-sulfonate and disodium 1-hydroxyanthracene-5-sulfonate. In particular, the dialkali metal salts of phenolsulfonic acid are excellent not only in performance, but also from an economic view point. Of such dialkali metal salts, disodium phenolsulfonate is most preferred.

In the crystallization accelerators useful according to this invention, the alkali metals constituting the sulfonic acid alkali metal salt group and phenolic hydroxy alkali metal salt group may be either the same or different. As such alkali metals, lithium, sodium and potassium are generally used. In addition, rubidium, cesium and francium may be used. When the alkali metals constituting the two functional groups are different from each other, and combination of alkali metals may be bound to either of the two functional groups.

The amount of the crystallization accelerator added is from about 0.05% to 20% by weight, preferably from 0.1% to 15% by weight, based on the weight of the polyester. For example, with polyethylene terephthalate containing 3% by weight of disodium p-phenolsulfonate, the isothermal crystallization time when it is cooled rapidly to 200° C. after being melted at 270° C. is 10 seconds or less. Comparing this with a time of 6.5 minutes for the original polyethylene terephthalate (i.e., without the use of the crystallization accelerator), it can be seen that the crystallization accelerator used according to the process of this invention greatly accelerates the crystallization.

The isothermal crystallization time as referred to herein is measured as follows:

Using IB type Differential Scanning Calorimeter (DSC) produced by Perkin Elmer Co., a polyethylene terephthalate sample (chip; 10 mg) is melted at 270° C. for 10 minutes and then cooled rapidly to 200° C., and when the temperature-detecting part of the apparatus reaches 200° C., a crystallization exothermic curve is drawn while maintaining the part at that temperature.

The time required for reaching the peak of the curve is referred to as the "isothermal crystallization time."

When the amount of the crystallization accelerator added is less than 0.05% by weight, a sufficient crystallization acceleration effect is not exhibited. On the other hand, when it is more than 20% by weight, the melt viscosity greatly increases and the fluidity decreases, resulting in difficult handling, and, furthermore, the inherent characteristics of the polyester are deteriorated.

Although the reason why the crystallization accelerator of this invention greatly accelerates the crystallization of polyesters, such as polyethylene terephthalate, is not yet completely clear, the following observations have been made:

When a polyethylene terephthalate sample containing 2% by weight based o the polyethylene terephthalate of disodium p-phenolsulfonate was melted at 280° C. and then cooled at a rate of 16° C. per minute by the use of the above-described differential scanning calorimeter to draw a recrystallization exothermic curve, the peak temperature of the curve was 213° C., which is much higher than the peak temperature of 180° C. of the original polyethylene terephthalate. This indicates that the addition of the crystallization accelerator causes the crystallization of polyethylene terephthalate occurring during cooling from the molten state to occur at an earlier stage than in the case wherein no accelerator is added.

When the same polyethylene terephthalate sample as used above was raised from room temperature at a rate of 16° C. per minute by the use of the differential scanning calorimeter to draw a crystallization exothermic curve, the peak temperature of the curve was 114° C., which is much lower than 125° C. of the original polyethylene terephthalate. This indicates that the addition of the crystallization accelerator causes the crystallization of polyethylene terephthalate in the course of being heated from the solid state to occur at an earlier stage than in the case wherein no accelerator is added.

Furthermore, microscopic observation of the same polyethylene terephthalate sample as above in the course of being cooled from the molten state showed that the number of locations therein where the crystallization started was much larger than the number for the original polyethylene terephthalate, and it can thus be clearly seen that the disodium p-phenolsulfonate acts as a crystal nucleating agent.

Based on the observation that the rate of crystallization is increased as the amount of the crystallization accelerator added is increased, it appears that the crystallization accelerator acts as a crystal nucleus and at the same time, it has the effect of increasing the rate of growth of polyethylene terephthalate crystal growing from the nucleus.

Although the exact state in which the crystallization accelerator of this invention is present in polyethylene terephthalate is also not clear, based on the observations that the addition of the crystallization accelerator markedly increases the viscosity of polyethylene terephthalate in the molten state, that the increase in the viscosity of the polyethylene terephthalate in a molten state becomes more significant as the amount of the crystallization accelerator added is increased, and that the increase in the viscosity of polyethylene terephthalate varies depending on the type and number of the alkali metal contained in the crystallization accelerator (thus indicating that the ion radius of the alkali metal has some effect on the increase in the viscosity), it is believed that the crystallization accelerator is present in the polyethylene terephthalate in a state wherein it ionically-crosslinks polyethylene terephthalate molecules.

The alkali metal salts of strong acids such as sulfonic acid alkali metal salts as heretofore known are not good crystallization accelerators because they cannot be dispersed uniformly in polyethylene terephthalate; on the other hand, it appears that since the crystallization accelerator of this invention contains two or more functional groups, i.e., the sulfonic acid alkali metal salt group and the phenolic hydroxy alkali metal salt group with the skelton of the aromatic ring interposed therebetween (regardless of the ortho, meta and para arrangement of the salt groups), it can be incorporated uniformly in polyethylene terephthalate.

In one embodiment, it is desirable that the crystallization accelerator of this invention be added during synthesis of the polyethylene terephthalate. For example, the crystallization accelerator can be added to the main starting materials, e.g., dimethyl terephthalate or terephthalic acid and ethylene glycol, before the start of the polymerization reaction thereof, or in the course of the ester exchange reaction or esterization reaction of the main starting materials, or before the start of the polycondensation reaction.

Alternatively, it is possible that polyethylene terephthalate chips are first produced, and then, after melting the chips, the crystallization accelerator is kneaded thereinto. In this case, however, it is essential that a high performance kneading apparatus is used in order to achieve the uniform dispersion of the crystallization accelerator.

The crystallization accelerator of this invention may be added either in the form of solid powder or in the form of a slurry or liquid prepared by dispersing in glycols such as ethylene glycol.

Although the above explanation has been given primarily with respect to polyethylene terephthalate, of course, the crystallization accelerator of this invention can be applied to other polyesters. Examples of other polyesters to which the crystallization accelerator of this invention can be effectively applied include homopolymers such as polybutylene terephthalate, polypropylene terephthalate, polyneopentylene terephthalate, polyhexylene terephthalate, etc., copolymerization polyesters as above in which other dibasic acids or glycols, or polyethylene glycol, etc., are incorporated, and ether bond-containing polyesters such as poly-p-ethyleneoxy benzoate, etc.

Because the polyesters containing the crystallization accelerator according to this invention are increased in crystallization rate, they will find many useful applications. To the polyesters with the crystallization accelerator added thereto, there can further be added other additives and fillers which are ordinarily used in conventional polyesters, for example, a reinforcing fiber (e.g., glass fiber, carbon fiber, organic heat-resistant fiber, etc.), an inorganic filler, a lubricant, a releasing agent, a plasticizer, a flame-retarder, an antistatic agent, a foaming agent, a dye or pigment, a stabilizer, and other polymers and oligomers. In the case of the glass fiber, it is typically added in such a manner that it constitutes from about 10 to 60% by weight of the total weight of the polyester, crystallization accelerator, and glass fiber.

Addition of 2 to 3% by weight of the crystallization accelerator of this invention and 30 to 50% by weight of the glass fiber to polyethylene terephthalate, which is often used as a fiber, a film, or the like because of its excellent characteristics (but, in general, has not been capable of being used in injection molding because of its low crystallization rate), permits excellent injection molding of the polyethylene terephthalate at a mold temperature of 120° C. or less, and therefore practical utilization of the polyethylene terephthalate as an engineering plastic for injection molding.

Furthermore, addition of 1 to 2% by weight of the crystallization accelerator of this invention to polybutylene terephthalate (which is normally used in injection molding) permits the injection molding thereof at much higher cycle rates.

Furthermore, in producing a fiber of polyethylene terephthalate, for example, if a very small amount of the crystallization accelerator of this invention is added thereto, the crystallization will occur rapidly after the spinning thereof. Therefore, by providing only a simple stretching apparatus after the step of spinning, it is possible to achieve effective stretching of the polyethylene terephthalate fiber. This permits spin-draw-take up at low costs. Moreover, when an nonwoven fabric is produced using the fiber which has been subjected to efficient stretching just after the spinning, a polyethylene terephthalate spunband having very high strength can be obtained.

Furthermore, addition of a small amount of crystallization accelerator of this invention to a hot melt adhesive comprising a copolymerization polyester prepared from terephthalic acid, isophthalic acid, adipic acid, 1,4-butane diol, etc., greatly increases the rate of solidification thereof. This increases the effectiveness of the adhesion step.

There are many other useful applications wherein the process using a crystallization accelerator according to this invention can be used.

The following examples and comparative examples are given to illustrate this invention in greater detail.

EXAMPLE AND COMPARATIVE EXAMPLE 1

A mixture of 200 parts by weight (hereinafter all parts are by weight) of dimethyl terephthalate, 142 parts of ethylene glycol, 8 parts of disodium p-phenolsulfonate, 0.1 part of manganese acetate and 0.1 part of antimony trioxide was charged to a reactor and subjected to an ester exchange reaction in an atmosphere of nitrogen at 190° C. for 3 hours. Then, most of the resulting methanol was distilled away. Thereafter, the reaction mixture was raised to 250° C. and the pressure was then gradually reduced, and then the reaction mixture was subjected to a polycondensation reaction in a vacuum of 0.5 mmHg at 280° C. for 4 hours.

The thus-obtained polycondensate had a melting point of 253°–257° C. and a reduction viscosity ($\eta sp/c$) of 0.80, and was white.

The reduction viscosity $\eta$ sp/c is a reduction viscosity of a solution of 1 g of the polycondensate in 1 dl (deciliter) of a mixed solvent of phenol and tetrachloroethane (60:40% by weight) measured at 35° C. by the usual method.

Using IB type Differential Scanning Calorimeter produced by Perkin Elmer Co., the polycondensate obtained above was melted at 275° C. for 10 minutes, and then lowered in temperature at a rate of 16° C. per minute to draw a recrystallization exothermic curve.

The recrystallization temperature (the temperature at which the peak of the curve appeared) was 217° C., which was higher than the 180° C. peak of conventional polyethylene terephthalate.

Next, using the same apparatus as described above, the polycondensate was melted at 275° C. for 10 minutes and then cooled rapidly to 220° C. and maintained at that temperature in order to obtain an isothermal crystallization peak at 220° C. However, the crystallization rate was so great that the peak overlapped with a curve drawn during the rapid cooling from 275° C. to 220° C. and was absorbed into the curve such an extent that no peak was formed and only a shoulder could be observed. No exact crystallization time could be measured.

On the other hand, the crystallization time of polyethylene terephthalate prepared in the same manner as above, except that no crystallization accelerator according to this invention was added, was 10 minutes or more.

Chips of the polycondensate were placed between two aluminum plates and pressed with a heat-plate press at 300° C., cooled in a mixture of dry ice and ethanol, and then dried with air to form a 7 mm $\times$ 7 mm film of a thickness of 0.25 mm. This film was soaked in a silicone oil bath maintained at 120° C. for 30 seconds, and then removed therefrom and washed with carbon tetrachloride and dried with air.

The density of the film obtained was 1,398 g/ml. Comparing this with the 1,360 g/ml film density prior to the heat treatment in the silicone oil bath, it can be seen that the crystallization of the polyethylene terephthalate proceeded considerably.

On the other hand, with the polyethylene terephthalate film prepared in the same manner as above except that no crystallization accelerator of this invention was added, the density after the heat treatment in the silicone oil for 30 seconds was 1,361 g/ml. Comparing this with the 1,355 g/ml film density prior to the heat treatment, almost no increase in the density was observed, and it can thus be concluded that the crystallization did not proceed significantly.

Next, the polycondensate was injection-molded from a 1.5 ounce injection molding machine (produced by Sumitomo Heavy Industries, Ltd.) using a dumbell mold No. 1 for tensile testing as defined in ASTM D 638. The injection molding conditions were: injection temperature, 285° C.; injection pressure, 450 kg/cm$^2$; plasticization time, 2 seconds; injection time, 10 seconds; cooling time, 20 seconds; and mold temperature, 110° C.

The releasing properties from the mold of the dumbell obtained were good, and the surface of the dumbell was lustrous, smooth, and white in color.

For comparison, a conventional polyethylene terephthalate having a reduction viscosity of 0.78 was injection-molded under the same conditions as described above. Releasing of the dumbell from an ejecter pin of the mold could not be performed well. When the dumbell was removed by force with hand, the shape of the dumbell was deformed, and whiskers were formed on the surface thereof.

In a further test, 69 parts of the polycondensate and 31 parts of 03MA 429 (glass fiber produced by Asahi Glass Fiber Co., Ltd.) were introduced into a 70 mm single screw extruder equipped with a Dulmage head from the hopper thereof and kneaded at 290° C., and then extruded in the form of a strand having a diameter of 6 mm and cut into a pellet form with a cutter. The thus-obtained pellets were charged into the same injection machine as described above and molded into a dumbell of the same form as above. The injection molding conditions were: injection temperature, 275° C.; injection pressure, 450 kg/cm$^2$; plasticization time, 5 seconds; injection time, 10 seconds; cooling time, 15 seconds; and mold temperature, 105° C.

Releasing properties from the mold of the dumbell obtained were very good, and the surface of the dumbell was lustrous, and grey-white in color.

EXAMPLES 2 TO 7 AND COMPARATIVE EXAMPLES 2 TO 7

A series of polyethylene terephthalates were prepared in the same manner and composition ratio as in Example 1 except that other crystallization accelerators according to this invention and conventional typical crystallization accelerators were added. With these polyethylene terephthalates, the isothermal crystallization time and the recrystallization temperature were measured in the same manner as in Example 1.

The results are shown in Table 1.

were observed as white masses or particles in the polyethylene terephthalate film.

EXAMPLE 8 AND COMPARATIVE EXAMPLE 8

A mixture of 100 parts of dimethyl terephthalate, 95 parts of 1,4-butanediol and 0.1 part of tetraisopropyl titanate was charged into a reactor and subjected to an ester exchange reaction at a temperature of 200° C. to 230° C. Thereafter, 4 parts of disodium-p-phenolsulfonate was added thereto and the resulting mixture was raised to 260° C., and the pressure was then gradually reduced. After raising the mixture to 265° C., a polycondensation reaction was performed in a vacuum of 0.5 mmHg for 4 hours to form polybutylene terephthalate. The reduction viscosity was 0.83 and the melting point was 223° C.

With the polybutylene terephthalate containing the crystallization accelerator, the recrystallization temperature and the isothermal crystallization time at 190° C. were measured by the same method as described in Example 1 and found to be 184° C. and 25 seconds, respectively.

For comparison, polybutylene terephthalate contain-

TABLE 1

| | Crystallization Accelerator | Recrystallization Temperature (°C.) | Isothermal Crystallization Time (sec) | Microscopic Observation of Polyethylene Terephthalate in Form of Film |
|---|---|---|---|---|
| Example 2 | lithium sodium p-phenolsulfonate | 212 | 30 | no particles resulting from crystallization accelerator were observed |
| Example 3 | dipotassium p-phenolsulfonate | 214 | 60 | no particles resulting from crystallization accelerator were observed |
| Example 4 | disodium m-phenolsulfonate | 216 | 10 | no particles resulting from crystallization accelerator were observed |
| Example 5 | disodium 2-naphthol-6-sulfonate | 211 | 57 | no particles resulting from crystallization accelerator were observed |
| Example 6 | disodium p-cresol-3-sulfonate | 215 | 25 | no particles resulting from crystallization accelerator were observed |
| Example 7 | disodium p-($\beta$-sulfoethoxy)phenol | 210 | 51 | no particles resulting from crystallization accelerator were observed |
| Comparative Example 2 | sodium phenolate | 208 | 90 | solid particles were observed in the film. |
| Comparative Example 3 | sodium acetate | 207 | 65 | solid particles were observed in the film. |
| Comparative Example 4 | disodium terephthalate | 206 | 89 | solid particles were observed in the film. |
| Comparative Example 5 | disodium p-sulfo benzoate | 200 | 141 | solid particles were observed in the film. |
| Comparative Example 6 | sodium phenylsulfonate | 201 | 210 | solid particles were observed in the film. |
| Comparative Example 7 | sodium dodecylbenzene sulfonate | 204 | 84 | solid particles were observed in the film. |

The polyethylene terephthalates containing the crystallization accelerators of this invention were generally much shorter in isothermal crystallization time than the polyethylene terephthalates containing the conventional crystallization accelerators.

Furthermore, the crystallization accelerators of this invention were dispersed uniformly to such an extent that no masses or particles resulting therefrom could be found in the polyethylene terephthalate film. On the other hand, the comparative crystallization accelerators ing no disodium p-phenolsulfonate was prepared in the same manner as described above. The recrystallization temperature and the isothermal crystallization time at 190° C. were 174° C. and 50 seconds, respectively.

From these results, it can be seen that the addition of disodium p-phenolsulfonate increases the crystallization rate of polybutylene terephthalate.

EXAMPLE 9 AND COMPARATIVE EXAMPLE 9

A mixture of 65 parts of dimethyl terephthalate, 65 parts of ethylene glycol and 0.05 part of manganese acetate was charged into a reactor and subjected to an ester exchange reaction at 200° C. for 2 hours. Thereafter, 35 parts of adipic acid was added thereto, and the resulting mixture was subjected to an esterification reaction at 220° C. for 4 hours. Then, 4 parts of lithium sodium p-phenolsulfonate and 0.04 part of antimony trioxide were added thereto, and the resulting mixture was raised to 260° C. and the pressure was then gradually reduced. After raising the temperature of the mixture to 280° C., a polycondensation reaction was performed in a vacuum of 0.5 mmHg for 4 hours to obtain polyethylene terephthalate adipate. The reduction viscosity of the copolymer obtained was 0.79.

With the polyethylene terephthalate adipate containing the crystallization accelerator, the recrystallization temperature and the isothermal crystallization time at 160° C. were 155° C. and 91 seconds, respectively.

For comparison, polyethylene terephthalate adipate containing no lithium sodium p-phenolsulfonate was prepared in the same manner as described above. No peak was observed in the recrystallization curve of the polyethylene terephthalate adipate and the isothermal crystallization time was 5 minutes or more.

From these results, it can be seen that the addition of lithium sodium p-phenolsulfonate also greatly increases the crystallization rate of polyethylene terephthalate adipate.

While the invention has been described in detail and with reference to specific embodiment thereof, it will be apparent to one skilled in the art that various changes and modifications can be made therein without departing from the spirit and scope thereof.

What is claimed is:

1. A process for injection molding a polyester by injection molding at a pressure of 450 Kg/cm$^2$ or less and at a mold temperature of from about 80° to about 120° C. with improved crystallization thereof, comprising incorporating, prior to molding, in the polyester as a crystallization accelerator a compound containing (1) at least one aromatic ring selected from the group consisting of a benzene ring, a naphthalene ring and an anthracene ring;
   (2) at least one sulfonic acid alkali metal salt group; and
   (3) at least one phenolic hydroxy alkali metal salt group in an amount of from 0.05 to 20% by weight based on the weight of the polyester.

2. A process as in claim 1 wherein the polyester is mainly composed of a terephthalate homopolymer, a copolymer thereof, or an ether bond-containing polyester.

3. A process as in claim 2 wherein the polyester is mainly composed of terephthalate homopolymer.

4. A process as in claim 2 wherein the polyester is mainly composed of a polyethylene terephthalate.

5. A process as in claim 1 wherein the compound incorporated in the polyester is a compound containing an aromatic ring to which at least one sulfonic acid alkali metal salt group and at least one phenolic hydroxy alkali metal salt group are directly bonded.

6. A process as in claim 5 wherein the compound incorporated in the polyester is a dialkali metal salt of phenolsulfonic acid.

7. A process as in claim 2 wherein the compound incorporated in the polyester is a dialkali metal salt of phenolsulfonic acid.

8. A process as in claim 3 wherein the compound incorporated in the polyester is a dialkali metal salt of phenolsulfonic acid.

9. A process as in claim 1 wherein the compound is incorporated in the polyester by adding the compound to the main starting materials prior to starting the polymerization reaction.

10. A process as in claim 2 wherein the compound is incorporated in the polyester by adding the compound to the main starting materials prior to starting the polymerization reaction.

11. A process as in claim 3 wherein the compound is incorporated in the polyester by adding the compound to the main starting materials prior to starting the polymerization reaction.

* * * * *